(12) United States Patent
Hunt et al.

(10) Patent No.: US 8,767,921 B2
(45) Date of Patent: *Jul. 1, 2014

(54) SYSTEM AND METHOD FOR DETECTING ANOMALIES ALONG TELECOMMUNICATION LINES

(75) Inventors: Gary Hunt, Gurley, AL (US); Fred Chu, Madison, AL (US); Lee T. Gusler, Jr., Madison, AL (US)

(73) Assignee: ADTRAN, Inc., Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/546,417

(22) Filed: Jul. 11, 2012

(65) Prior Publication Data

US 2012/0281818 A1 Nov. 8, 2012

Related U.S. Application Data

(63) Continuation of application No. 12/267,273, filed on Nov. 7, 2008, now Pat. No. 8,242,785, which is a continuation of application No. 10/727,411, filed on Dec. 4, 2003, now Pat. No. 7,460,498.

(51) Int. Cl.
*H04M 1/24* (2006.01)
*H04M 3/08* (2006.01)
*H04M 3/22* (2006.01)

(52) U.S. Cl.
USPC ........................................ 379/22.03

(58) Field of Classification Search
USPC .......................... 379/406.01, 22.03
See application file for complete search history.

(56) References Cited

U.S. PATENT DOCUMENTS

| | | | |
|---|---|---|---|
| 3,789,296 A | 1/1974 | Caruso |
| 4,243,959 A | 1/1981 | Duttweiler |
| 4,270,029 A | 5/1981 | Sato et al. |
| 4,289,398 A | 9/1981 | Robichaud |
| 4,301,538 A | 11/1981 | Desombre et al. |
| 4,325,022 A | 4/1982 | Pelletier |
| 4,404,514 A | 9/1983 | Reichert |
| 4,499,417 A | 2/1985 | Wright et al. |
| 4,756,005 A | 7/1988 | Shedd |
| 4,859,951 A | 8/1989 | Cole et al. |
| 5,065,241 A | 11/1991 | Iga |
| 5,083,086 A | 1/1992 | Stiener |
| 5,084,865 A | 1/1992 | Koike |
| 5,111,497 A | 5/1992 | Bliven et al. |
| 5,244,067 A | 9/1993 | Skotek et al. |
| 5,373,356 A | 12/1994 | Anderson |
| 5,574,377 A | 11/1996 | Marquez-Lucero et al. |

(Continued)

OTHER PUBLICATIONS

Hunt, et al., U.S. Appl. No. 12/267,273, entitled "System and Method for Detecting Anomalies Along Telecommunication Lines," filed Nov. 7, 2008.

*Primary Examiner* — Alexander Jamal
(74) *Attorney, Agent, or Firm* — Maynard Cooper & Gale, P.C.; Jon E. Holland (57) ABSTRACT

An anomaly detection system comprises an echo canceler and anomaly detection logic. The echo canceler has a plurality of taps respectively associated with a plurality of tap coefficients. The anomaly detection logic is configured to determine a difference between a new tap coefficient associated with one of the taps and a previous tap coefficient associated with the one tap. The anomaly detection logic is configured to perform a comparison between the difference and a threshold and to detect an anomaly along a telecommunication line based on the comparison.

25 Claims, 7 Drawing Sheets

(56) References Cited

U.S. PATENT DOCUMENTS

| | | | |
|---|---|---|---|
| 5,608,328 A | 3/1997 | Sanderson | |
| 5,761,938 A | 6/1998 | College | |
| 5,774,316 A | 6/1998 | McGary et al. | |
| 6,011,399 A | 1/2000 | Matsumaru et al. | |
| 6,167,133 A | 12/2000 | Caceres et al. | |
| 6,480,532 B1 | 11/2002 | Vareljian | |
| 6,693,992 B2 | 2/2004 | Jones et al. | |
| 6,697,768 B2 | 2/2004 | Jones et al. | |
| 6,807,370 B2 | 10/2004 | Harasawa | |
| 6,819,744 B1 | 11/2004 | Banwell et al. | |
| 6,819,749 B1 | 11/2004 | Olafsson et al. | |
| 6,825,672 B1 | 11/2004 | Lo et al. | |
| 6,829,293 B2 | 12/2004 | Jones et al. | |
| 6,868,357 B2 | 3/2005 | Furse | |
| 6,937,944 B2 | 8/2005 | Furse et al. | |
| 6,975,706 B1 | 12/2005 | Joffe et al. | |
| 6,981,186 B2 | 12/2005 | Ginesi et al. | |
| 7,023,963 B1 | 4/2006 | Chu et al. | |
| 7,174,488 B1 | 2/2007 | Chu | |
| 7,460,498 B2 | 12/2008 | Hunt et al. | |
| 2004/0013178 A1 | 1/2004 | Bui et al. | |
| 2004/0114752 A1* | 6/2004 | Rude et al. | 379/406.01 |
| 2005/0063323 A1 | 3/2005 | Schenk | |
| 2005/0220043 A1 | 10/2005 | Handel et al. | |

* cited by examiner

SYSTEM AND METHOD FOR DETECTING ANOMALIES ALONG TELECOMMUNICATION LINES

CROSS REFERENCE TO RELATED APPLICATIONS

This application is a continuation of U.S. patent application Ser. No. 12/267,273, entitled "System and Method for Detecting Anomalies Along Telecommunication Lines," and filed on Nov. 7, 2008, which is incorporated herein by reference. U.S. patent application Ser. No. 12/267,273 is a continuation of U.S. Pat. No. 7,460,498, entitled "System and Method for Detecting Anomalies Along Telecommunication Lines," and filed on Dec. 4, 2003, which is incorporated herein by reference.

RELATED ART

Telecommunication lines, such as a digital subscriber line (DSL), for example, usually comprise sections of wire that have been joined together to form a data path from one location to another (e.g., from communication equipment at a central office to communication equipment at a customer premises). A point where two sections of a telecommunication line are joined is often referred to as a "splice." In forming a splice, the end of one section is usually wrapped around or otherwise joined to an end of another section, and the two joined ends may be soldered in an effort to ensure that the splice does not loosen.

In this regard, it is generally desirable for the two joined section ends forming a splice to remain in a tightly joined position in an effort to minimize the resistivity of the splice. However, over time, a splice may become degraded (e.g., loosen) such that the resistivity of the splice fluctuates. Such resistivity fluctuation can significantly disrupt communication occurring over the telecommunication line that includes the splice.

Thus, when a splice becomes significantly degraded, it may be desirable for a technician to locate and repair the degraded splice in an effort to improve communication occurring over the telecommunication line that includes the degraded splice. However, locating such a degraded splice can be difficult. In particular, disruption of communication occurring over a telecommunication line may be caused by a variety of factors in addition to or in lieu of degraded splices. Thus, diagnosing a communication problem attributable to a degraded splice can be problematic. Further, many telecommunication lines extend for very long distances (e.g., on the order of several miles) and are often buried in the ground. Accordingly, even when a communication problem is correctly diagnosed as attributable to a degraded splice along a telecommunication line, locating the degraded splice can be difficult and expensive.

Thus, a heretofore unaddressed need exists in the art for improved systems and methods of detecting and locating degraded splices and other types of anomalies along a telecommunication line.

SUMMARY OF THE INVENTION

Generally, embodiments of the present invention provide systems and methods for detecting anomalies along telecommunication lines.

An anomaly detection system in accordance with one exemplary embodiment of the present invention comprises an echo canceler and anomaly detection logic. The echo canceler has a plurality of taps respectively associated with a plurality of tap coefficients. The anomaly detection logic is configured to determine a difference between a new tap coefficient associated with one of the taps and a previous tap coefficient associated with the one tap. The anomaly detection logic is configured to perform a comparison between the difference and a threshold and to detect an anomaly along a telecommunication line based on the comparison.

An anomaly detection system in accordance with another exemplary embodiment of the present inventions comprises an echo canceler and anomaly detection logic. The echo canceler has a plurality of taps respectively associated with a plurality of tap coefficients. The anomaly detection logic is configured to determine when at least one of the tap coefficients fluctuates by at least a specified amount and to detect an anomaly along a telecommunication line based on a detection, by the logic, that the at least one tap coefficient fluctuated by at least the specified amount.

An anomaly detection system in accordance with yet another exemplary embodiment of the present invention comprises an echo canceler and anomaly detection logic. The echo canceler has a plurality of taps respectively associated with a plurality of tap coefficients. The anomaly detection logic is configured to establish a set of baseline tap coefficients based on the tap coefficients. The anomaly detection logic is configured to compute differences between new tap coefficients of the echo canceler and the baseline tap coefficients and to detect an anomaly along a telecommunication line based on the differences.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present disclosure generally pertains to systems and methods for detecting anomalies, such as degraded splices, for example, along a telecommunication line. An anomaly detection system in accordance with one exemplary embodiment of the present disclosure analyzes the tap coefficients of an echo canceler to detect a line anomaly. In this regard, according to known echo cancellation techniques, the echo canceler generates tap coefficients that are used to generate an echo cancellation signal for removing echoes from signals communicated over a telecommunication line coupled to the echo canceler. The anomaly detection system analyzes the tap coefficients of the echo canceler over time and determines when a tap coefficient significantly fluctuates. When the anomaly detection system identifies a significantly fluctuating tap coefficient, it may provide an indication that an anomaly, such as a degraded splice, exists along the telecommunication line at a distance corresponding to the fluctuating tap coefficient.

Figure 1:
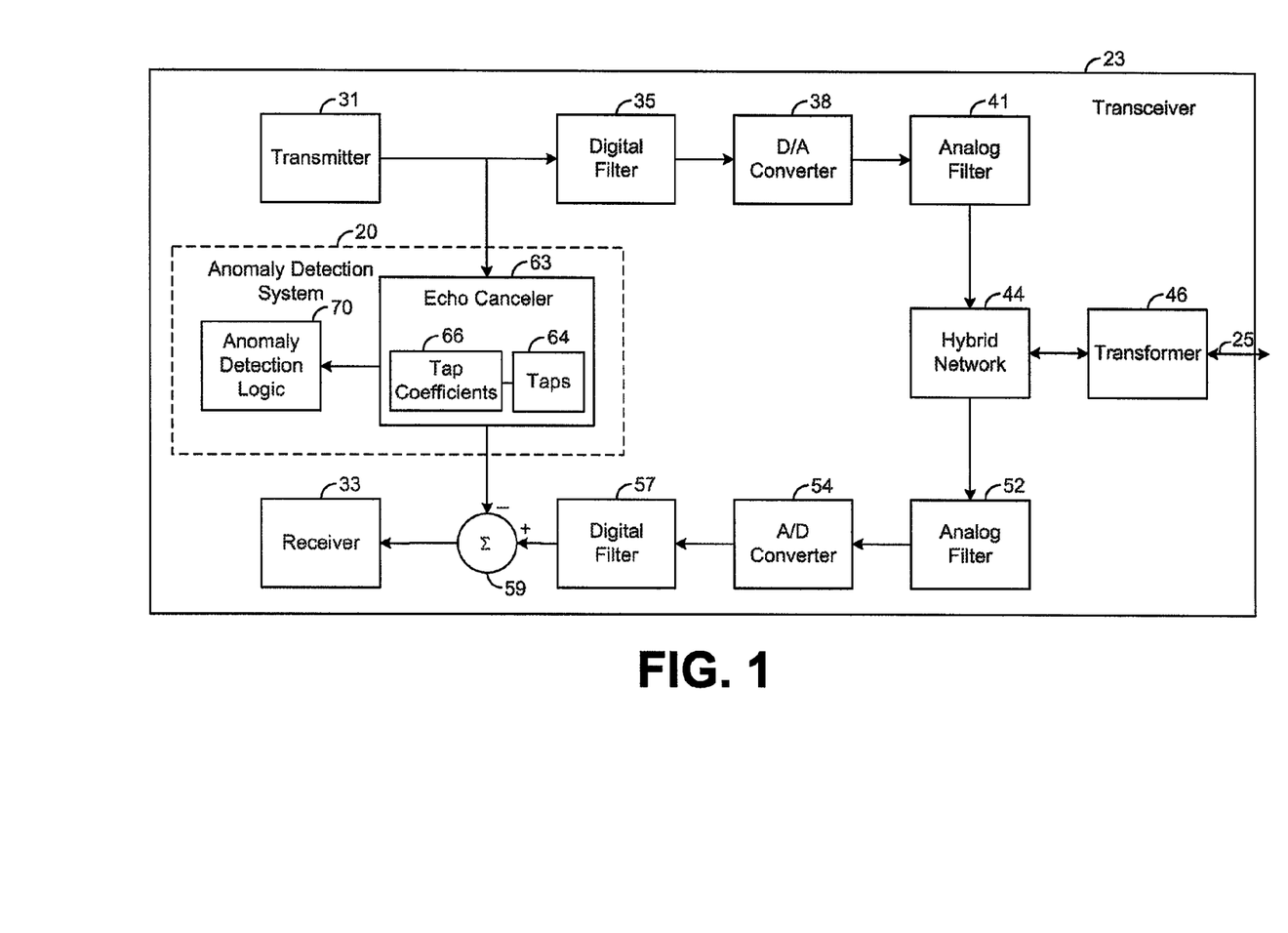
FIG. 1 is a block diagram illustrating a transceiver that employs an anomaly detection system in accordance with an exemplary embodiment of the present disclosure.

FIG. 1 depicts an anomaly detection system 20 in accordance with an exemplary embodiment of the present disclosure. As shown by FIG. 1, the anomaly detection system 20 may reside within a transceiver 23 that is coupled to and communicates over a telecommunication line 25, such as a digital subscriber line (DSL), for example. However, it should be noted that one or more components of the detection system 20 may be located external to the transceiver 23, if desired.

Figure 2:
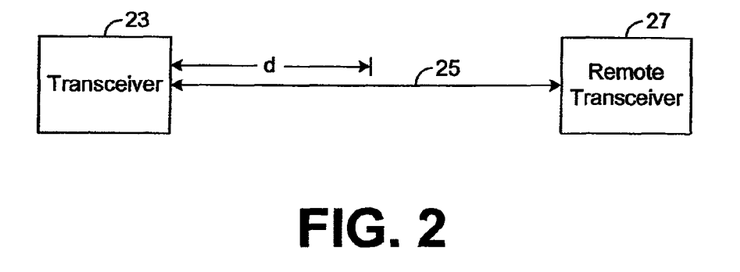
FIG. 2 is a block diagram illustrating the transceiver of FIG. 1 coupled to a remote transceiver via a telecommunication line.

As shown by FIG. 2, the transceiver 23 may be coupled to a remote transceiver 27 via the telecommunication line 25. In one example, the transceiver 23 may reside at a central office of a communication network, and the remote transceiver 27 may reside at a customer premises. In another example, the transceiver 23 may reside at a customer premises, and the remote transceiver 27 may reside at a central office. Other locations for the transceivers 23 and 27 are possible in other embodiments.

As shown by FIG. 1, the transceiver 23 comprises a transmitter 31 and a receiver 33. The transmitter 31 transmits a digital data signal to a digital filter 35, which filters the digital data signal and provides a filtered digital signal to a digital-to-analog (D/A) converter 38. The D/A converter 38 converts the filtered digital signal into an analog signal, which is filtered by an analog filter 41. This filtered analog signal is then applied to the telecommunication line 25 via a hybrid network 44 and a line-coupling transformer 46.

An analog signal on the telecommunication line 25 is coupled through transformer 46 and hybrid network 44 and is applied to an analog filter 52, which filters the received analog signal and provides a filtered analog signal to an analog-to-digital (A/D) converter 54. The A/D converter 54 converts the filtered analog signal into a digital signal, which is filtered by a digital filter 57. A differential summer 59 combines this filtered digital signal with an echo cancellation signal from an echo canceler 63 in order to cancel, from the filtered digital signal, echoes of signals transmitted by the transceiver 23 over the telecommunication line 25. The combined signal from the differential summer 59 is then received by the receiver 33.

Various known echo cancelers may be used to implement the echo canceler 63 of FIG. 1. In one exemplary embodiment, the echo canceler 63 is implemented as a linear adaptive finite impulse response (FIR) filter that uses a least mean squared (LMS) algorithm or other known or future-developed adaptive FIR algorithm to provide an echo cancellation signal that minimizes the error of the combined signal output from the differential summer 59. In other embodiments, other types of echo cancelers may be employed.

Using a plurality of taps 64 spaced along a tap delay line, the echo canceler 63 respectively multiplies tap coefficients 66 to delayed replicas of a digital input signal from transmitter 31 in order to output an appropriate echo cancellation signal. In this regard, each tap 64 is associated with a different tap coefficient, which may be adaptively changed in order control the shape of the echo cancellation signal. In general, to better suppress echoes, the tap coefficients are controlled such that the shape of the echo cancellation signal closely resembles or matches the shape of the echoes included in the signal output by the digital filter 57. Techniques for controlling the tap coefficients of an echo canceler such that the echo canceler outputs an appropriate echo cancellation signal are well-known in the art.

Figure 3:
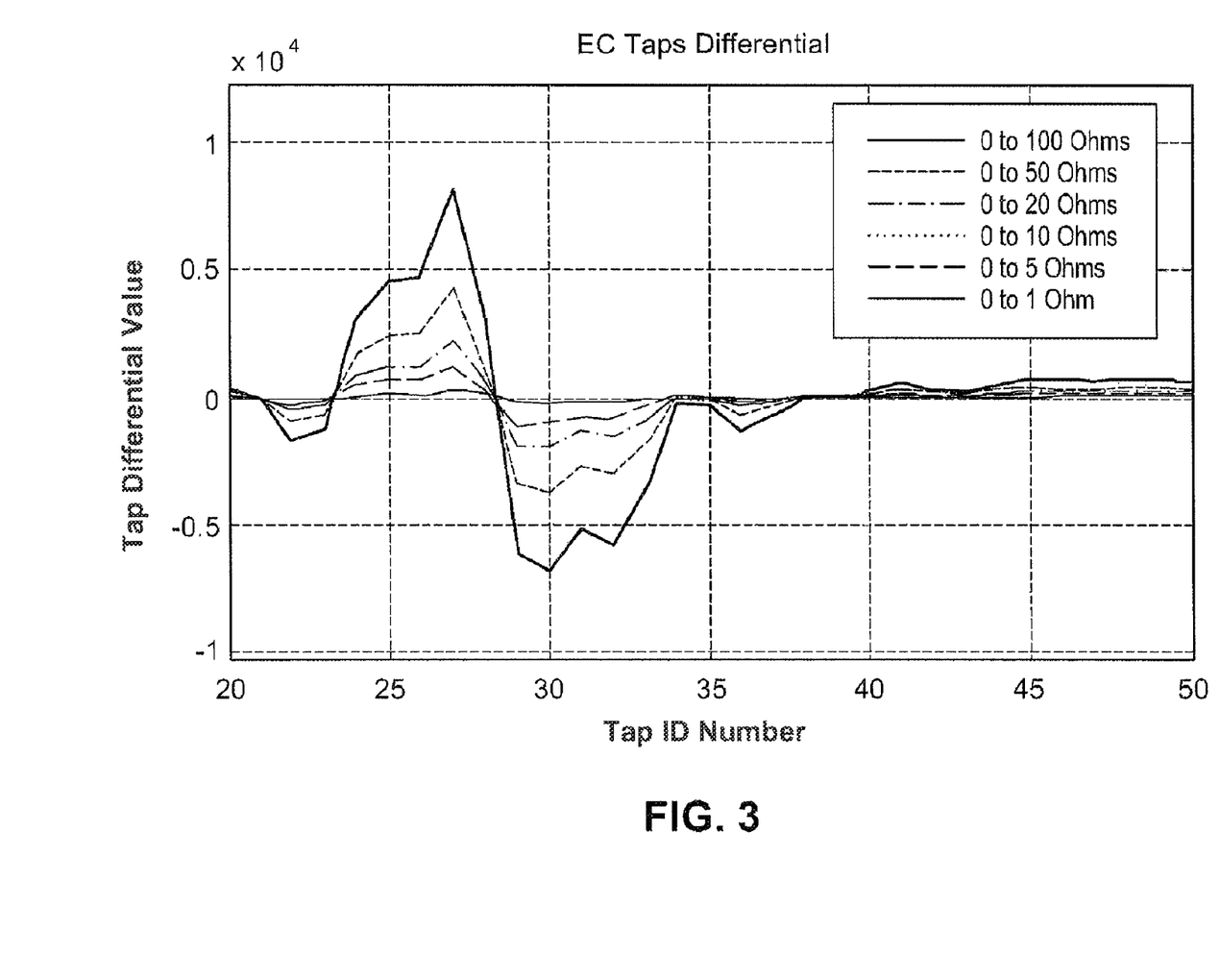
FIG. 3 is a graph illustrating differential tap coefficient values of a transceiver's echo canceler (EC) when the resistance of a point of a telecommunication line approximately at the transceiver is varied from 0 to 1 Ohms, 0 to 5 Ohms, 0 to 10 Ohms, 0 to 20 Ohms, 0 to 50 Ohms, and 0 to 100 Ohms.
Figure 4:
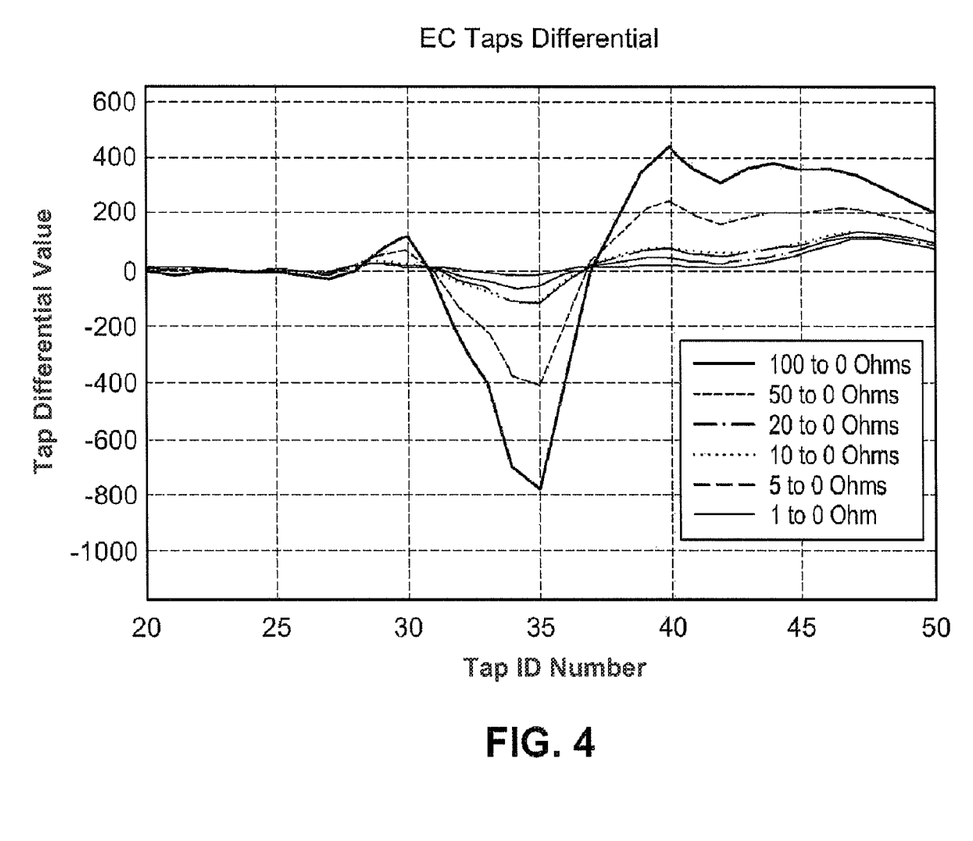
FIG. 4 is a graph illustrating differential tap coefficient values of a transceiver's echo canceler when the resistance of a point along a telecommunication line approximately 4000 feet from the transceiver is varied from 0 to 1 Ohms, 5 to 0 Ohms, 10 to 0 Ohms, 20 to 0 Ohms, 50 to 0 Ohms, and 100 to 0 Ohms.

Changes in the resistivity of the telecommunication line 25 induces changes in the tap coefficients of the echo canceler 63 if the echo canceler 63 is to maintain adequate echo cancellation. Indeed, FIGS. 3 and 4 show test results of simulating a degraded splice at distances of approximately 4000 feet from a transceiver 23. In this regard, to plot a differential tap coefficient value for a particular tap 64, the tap coefficient for the tap 64 is read and stored. Then, the resistance of a point along the telecommunication line 25 is varied from a first resistance to a second resistance. The tap coefficient for the tap 64 is then read and subtracted from the previously read tap coefficient. This difference is then plotted. The foregoing may be performed for each tap coefficient, and a curve may then be fitted to each plotted differential associated with the same resistivity change.

In FIG. 3, the point of varied resistivity is located close to (e.g., less than 1 foot from) the end of the telecommunication line 25 that is coupled to the transceiver 23. In FIG. 4, the point of varied resistivity is located approximately 4000 feet from the transceiver 23. In addition, in FIG. 3, the curves were obtained by varying the resistance of the line 25 from 0 to 1 Ohms, 0 to 5 Ohms, 0 to 10 Ohms, 0 to 20 Ohms, 0 to 50 Ohms, and 0 to 100 Ohms. In FIG. 4 the curves were obtained by varying the resistance of the line 25 from 5 to 0 Ohms, 10 to 0 Ohms, 20 to 0 Ohms, 50 to 0 Ohms, and 100 to 0 Ohms.

As can be seen by comparing FIGS. 3 and 4, a fluctuation in the resistivity of the telecommunication line 25 will have a greater effect on certain ones of the tap coefficients depending on the location of the resistivity fluctuation along the telecommunication line 25. Thus, a line anomaly, such as a degraded splice, that changes the resistance of a point along a telecommunication line can be detected and located by determining which of the tap coefficients are affected by the resistance fluctuations. Indeed, each tap coefficient can be correlated with a particular point along the telecommunication line 25 such that, if a determination can be made that a tap coefficient fluctuates due to a line anomaly, then it follows that the line anomaly is close in proximity to the correlated point. Such an approach can be used to implement an anomaly detection system and methodology as will be described in more detail hereinbelow.

As shown by FIG. 1, the anomaly detection system 20 comprises anomaly detection logic 70 that analyzes the tap coefficients 66 of the echo canceler 63 and detects anomalies, such as degraded splices, along the telecommunication line 25 based on the tap coefficients 66. The anomaly detection logic 70 can be implemented in software, hardware, or a combination thereof. In an exemplary embodiment illustrated in FIG. 5, the anomaly detection logic 70, along with its associated methodology, is implemented in software and stored in memory 75.

Note that the anomaly detection logic 70, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 5:
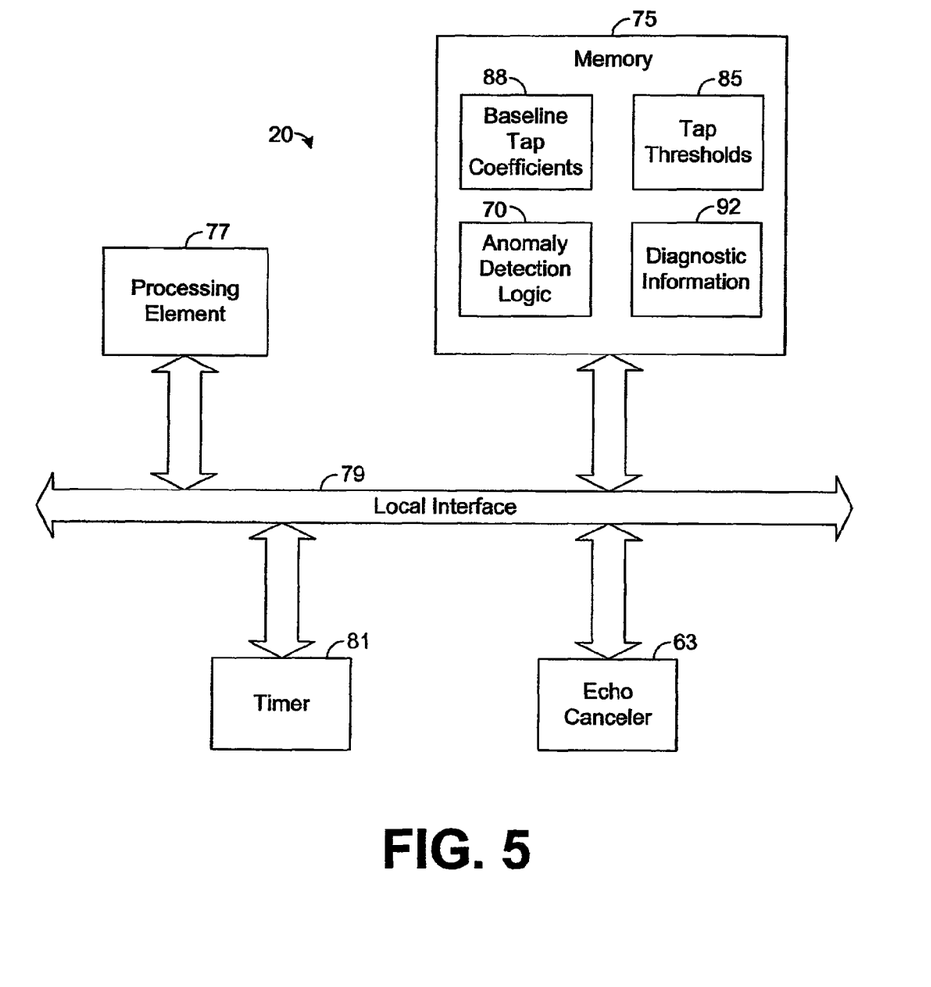
FIG. 5 is a block diagram illustrating the anomaly detection system of FIG. 1.

The exemplary embodiment of the anomaly detection system 20 depicted by FIG. 5 comprises at least one conventional processing element 77, such as a digital signal processor (DSP) or a central processing unit (CPU), that communicates to and drives the other elements within the system 20 via a local interface 79, which can include at least one bus. Furthermore, the system 20 may comprise at least one timer 81 that may be used by the anomaly detection logic 70, as will be described in more detail hereafter. The timer 81 may be implemented in hardware or a combination of hardware and software.

As shown by FIG. 5, a set of predefined tap thresholds 85 is stored in memory 75. Each tap threshold is associated with a different one of the echo canceler taps 64 (FIG. 1). The value of a tap threshold is established such that there is high likelihood of an anomaly, such as a degraded splice, existing at or close to a correlated point on telecommunication line 25 if a change in the value of the tap coefficient for the associated tap 64 exceeds the threshold.

Note that the values of the tap thresholds may be established based on FIGS. 3 and 4. For example, assume that it is desirable to detect a degraded splice if the resistivity of a point of the telecommunication line 25 fluctuates by more than 50 Ohms in a short amount of time. In such an example, the 50 Ohm curves of FIGS. 3 and 4 may be used to establish the tap threshold for a particular tap 64. In this regard, the tap threshold for a particular tap 64 may be assigned the peak (either positive or negative) tap differential value associated with the particular tap 64 and plotted in the 50 Ohm curves for either of the graphs depicted by FIGS. 3 and 4. As an example, noting that each tap 64 is assigned a different identifier number ranging from 20 to 50 in FIGS. 3 and 4, the tap 64 having identifier number 28 appears to be associated with a peak tap coefficient differential close to the value of 4000 for the 50 Ohm curve of FIG. 3. Thus, the tap threshold associated with the foregoing tap 64 may have a value of 4000.

During operation, the anomaly detection logic 70 reads a set of tap coefficients 66 from the echo canceler 63 and stores this set of tap coefficients, referred to hereafter as "baseline tap coefficients 88," in memory 75 (FIG. 5). Generally, if there are no anomalies present on the telecommunication line 25, then the tap coefficients in the echo canceler 63 should not significantly vary except for gradual variations over time due to temperature fluctuations. Moreover, the anomaly detection logic 70 periodically reads the current tap coefficients from the echo canceler 63 and compares the current tap coefficients to the baseline tap coefficients. In particular, each baseline tap coefficient and current tap coefficient is associated with a different echo canceler tap 64. As used herein, the baseline tap coefficient and current tap coefficient that are both associated with the same echo canceler tap will be referred to hereafter as a "tap pair." For each tap pair, the anomaly detection logic 70 subtracts the current tap coefficient from the baseline tap coefficient. In other words, the anomaly detection logic 70 computes the difference between the coefficients of the tap pair.

After computing the tap pair difference, the anomaly detection logic 70 compares the tap pair difference to the corresponding tap threshold (i.e., the tap threshold associated with the same echo canceler tap 64 as the tap pair) stored in memory 75. If the absolute value of the tap pair difference exceeds the absolute value of the corresponding tap threshold, then the anomaly detection logic 70 provides an anomaly indication. In this regard, if the absolute value of the tap pair difference exceeds the absolute value of the corresponding tap threshold, then the tap coefficient 66 of the associated tap 64 has significantly changed over time (i.e., between reading of the baseline tap coefficient of the tap pair and the current tap coefficient of the tap pair). Such a significant change may indicate that an anomaly, such as a degraded splice, for example, is on the telecommunication line 25 at a location corresponding to the tap pair and its associated tap 64. Thus, the anomaly indication provided by the anomaly detection logic 70 may indicate that an anomaly exists on the telecommunication line 25 at the location corresponding to the tap coefficient pair on which the anomaly indication is based.

To help increase the accuracy of the anomaly detection performed by the logic 70, the logic 70 may track a history of its anomaly indications. In this regard, the anomaly detection logic 70 may maintain diagnostic information 92 (FIG. 5) indicative of the history of the anomaly detections provided by the logic 70. In one embodiment, the diagnostic information 92 comprises a histogram having a plurality of values in which each histogram value corresponds to a different echo canceler tap 64. Each time the difference of a tap pair associated with the tap 64 (i.e., the difference of a tap's current and baseline tap coefficients) exceeds the corresponding tap threshold, the anomaly detection logic 70 may increment the corresponding histogram value. Thus, each histogram value is essentially a running sum of the number of anomaly indications provided by the logic 70 for a particular one of the taps 64. Generally, the higher a tap's corresponding histogram value, the more likely it is that an anomaly exists on the telecommunication line 25 at the location corresponding to the tap 64. Thus, by analyzing the histogram values, it is possible to identify locations on the telecommunication line 25 where anomalies exist.

To help increase the effectiveness of the histogram as a tool to estimate locations of anomalies along the telecommunication line 25, the baseline tap coefficients may be updated from time to time. To update a baseline tap coefficient, the current tap coefficient associated with the same tap 64 as the baseline tap coefficient may be read by the anomaly detection logic 70 and used to replace the baseline tap coefficient. By periodically updating the baseline tap coefficients in this manner, gradual variations in the tap coefficients due to gradual temperature fluctuations can be accommodated such that the gradual variations in the coefficient taps due to temperature fluctuations do not cause many false anomaly indications.

In addition, a better histogram may be defined by updating one or more baseline tap coefficients for each occurrence of an anomaly indication. In this regard, if the anomaly detection logic 70 determines that a tap pair difference exceeds the corresponding tap threshold, then in addition to providing an anomaly indication (e.g., in addition to incrementing the corresponding histogram value), the anomaly detection logic 70 may also update the baseline tap coefficients by replacing the baseline tap coefficients with the current tap coefficients. In an alternative embodiment, the baseline tap coefficients may be updated each time new current tap coefficients are read from the echo canceler 63 regardless of whether any anomaly indications based on the new current tap coefficients are generated. Other embodiments that update the baseline tap coefficients in different manners are also possible.

Figure 6:
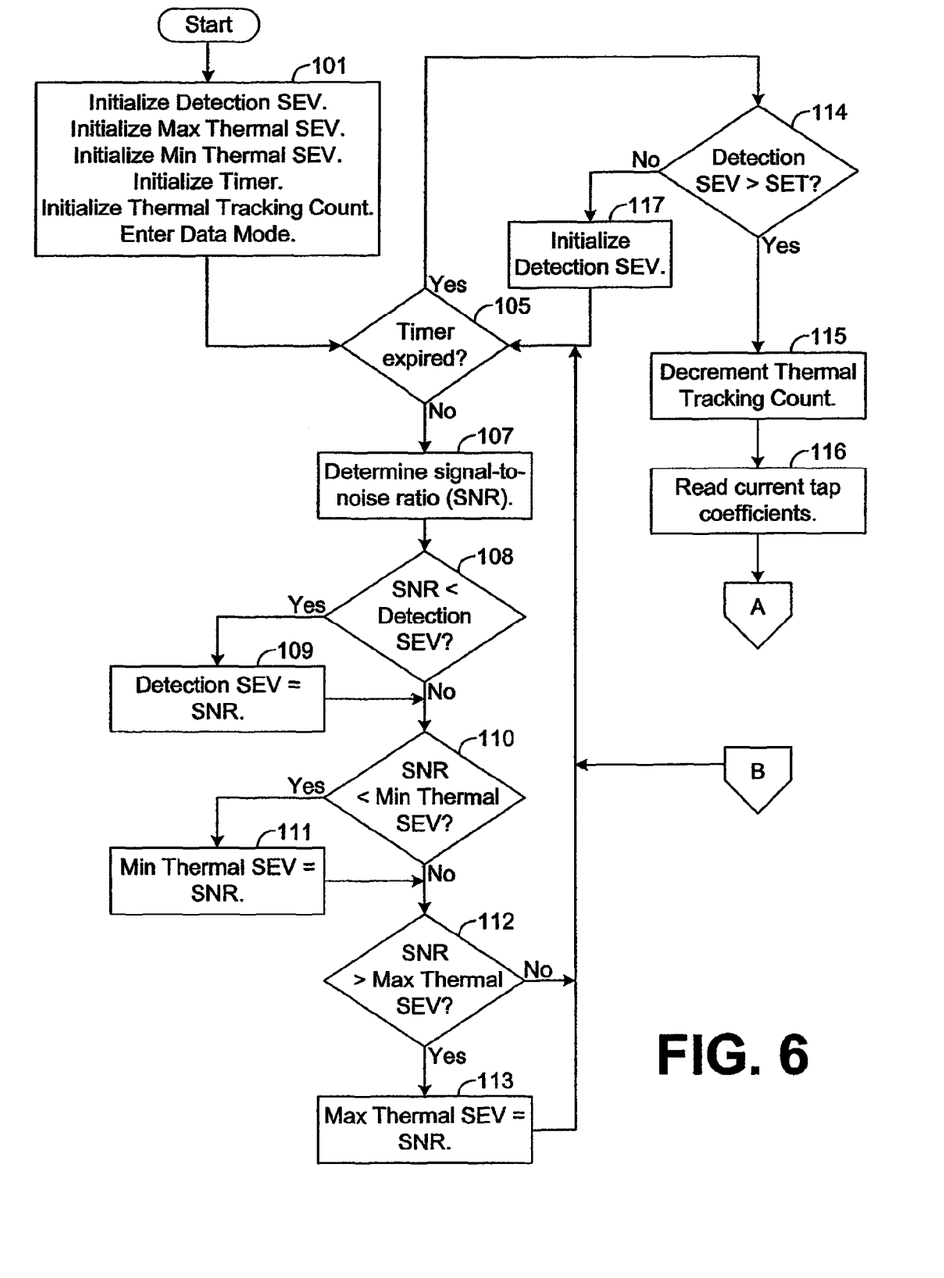
FIGS. 6 and 7 depict a flow chart illustrating an exemplary methodology that may be used by the anomaly detection system of FIG. 1.
Figure 7:
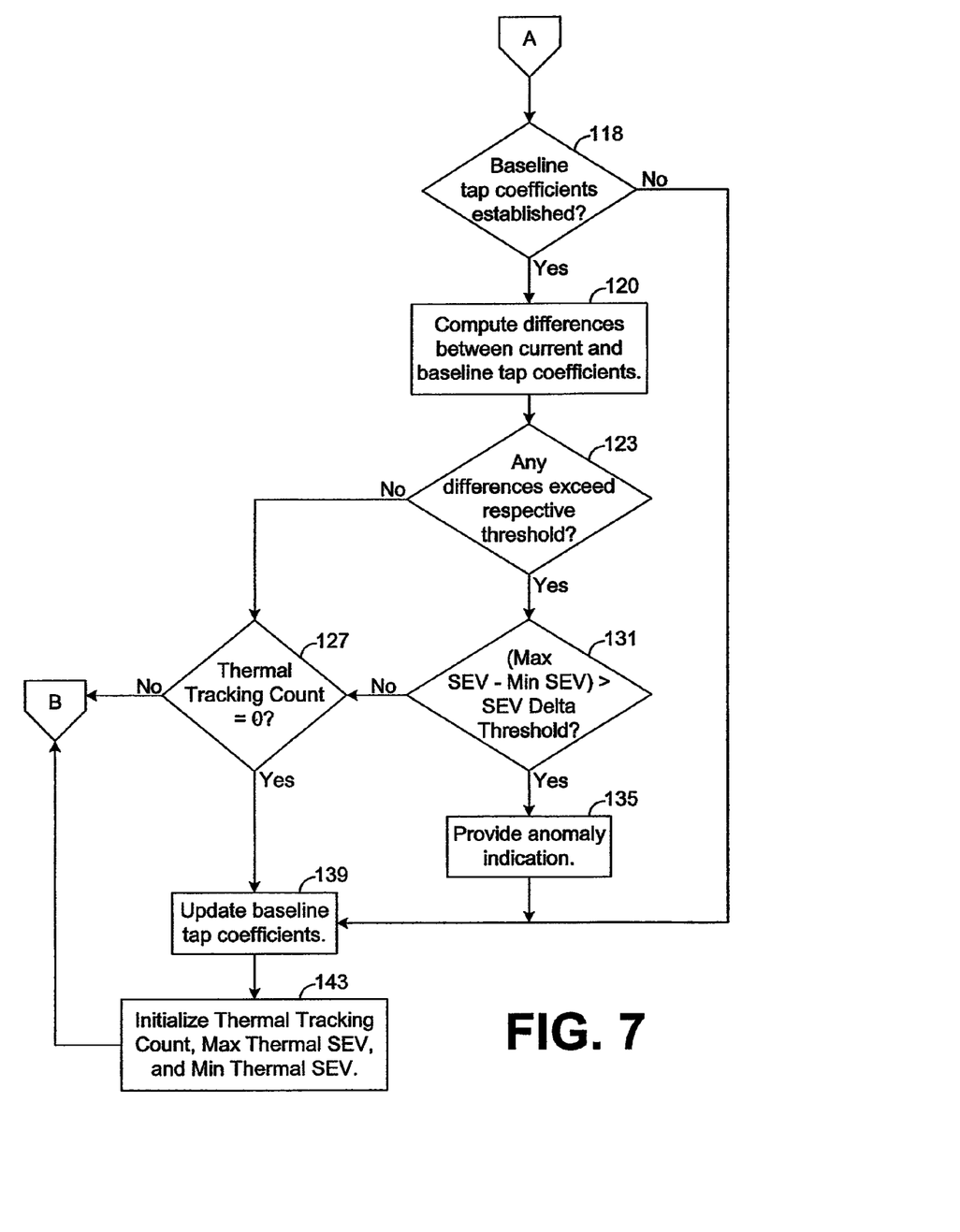

There are various methodologies that may be used to detect a telecommunication line anomaly based on whether a particular tap coefficient of an echo canceler significantly fluctuates over time. Described hereafter are two cases that these methodologies address. The first case ("case one") is when the severity of the anomaly is such that it causes the transceiver to have degraded performance, and possibly even an occasional loss of synchronization resulting in retraining of the transceiver. The second case ("case two") is when the severity of the anomaly prevents synchronization altogether. FIGS. 6 and 7 depict an exemplary methodology that may be employed by the anomaly detection logic 70 in order to detect an anomaly, such as a degraded splice, of telecommunication line 25. The methodology of FIGS. 6 and 7 addresses the lower severity anomaly case identified as case one above.

For the purposes of illustration, assume that the anomaly detection logic 70 is configured to track the coefficients of n number taps of the echo canceler 63, where n is any positive integer. Further assume that a particular one of the taps 64, referred to hereafter as "tap a," corresponds to a location on the telecommunication line 25 that is a distance "d"(FIG. 2) from the transceiver 23. In this regard, a change in the contact resistance of the telecommunication line 25 at a distance d from the transceiver 23 causes the tap coefficient of tap a to change. For the purposes of illustration, assume that a significantly degraded splice is located at distance d from the transceiver 23, thereby causing the contact resistance of the line 25 at distance d from the transceiver 23 to significantly fluctuate over time. Also assume that there are no other degraded splices or other types of line anomalies on the telecommunication line 25.

Similar to conventional transceivers, the transceiver 23 of FIG. 1 may establish communication settings, such as an initial set of tap coefficients 66, for example, in a training mode and then communicate data in a data mode that follows the training mode. In the embodiment depicted by FIGS. 6 and 7, block 101 shows the initialization of the timer 81 (FIG. 5), thermal tracking count, maximum thermal SEV (Signal Error Value), minimum thermal SEV, and detection SEV, which will all be discussed later. Note that the thermal tracking count, the maximum SEV, minimum thermal SEV, and detection SEV are all variables. In one exemplary embodiment, the thermal tracking count is initialized to a value of four, and the maximum SEV is initialized to a value of zero. Further, the detection SEV and the minimum SEV are both respectively initialized to their highest possible value. For example, if an 8-bit value is used to represent the detection SEV, then this variable is initialized to a value of two-hundred-fifty-five. Similarly, if an 8-bit variable is used to represent the minimum SEV, then this variable is also initialized to a value of two-hundred-fifty-five (255). Note that the foregoing variables may be initialized to other values in other embodiments.

In addition to initializing the aforedescribed variables, the anomaly detection logic 70 initializes the timer 81 such that it periodically expires. In the exemplary embodiments described herein, it will be assumed that the timer 81 is initialized to expire every thirty seconds, although other timing cycles may be employed in other embodiments.

Block 101 also shows the transceiver 23 transitioning into the data mode from the training mode. In the data mode, steps are taken to help ensure that the baseline tap coefficients 88 used to detect line anomalies are defined during reliable time periods (e.g., during periods that are substantially free of communication errors occurring over line 25). Exemplary techniques for achieving the foregoing will now be described in detail.

In this regard, the anomaly detection logic 70 sets the detection SEV to a value indicative of an amount of error recently occurring across the line 25. For example, as described above, the timer 81 is configured to periodically expire (e.g., every 30 seconds in the instant embodiment), and the detection SEV may be the minimum signal-to-noise ratio detected during the last cycle of timer 81 (i.e., between the last consecutive expirations of the timer 81). In another embodiment, the detection SEV may be an average signal-to-noise ratio detected during the last cycle of timer 81. In yet another embodiment, the detection SEV may be the total number of bit errors detected during the last cycle of timer 81. In essence, the detection SEV can be any value that is indicative of an amount of error that recently occurred over line 25, and other types of values for the detection SEV not specifically discussed herein may be used in other embodiments.

For the purposes of illustration, assume hereafter that the detection SEV is a minimum signal-to-noise ratio (SNR) detected since initialization of the detection SEV in either block 101, 117, or 143. Therefore, a lower value for the detection SEV indicates that a higher number of errors or level of noise recently occurred over the telecommunication line 25. Also assume that the minimum thermal SEV is the minimum signal-to-noise ratio for the line 25 detected since the last initialization of this variable in block 101 or 143, and assume that the maximum thermal SEV is the maximum signal-to-noise ratio for the line 25 detected since the last initialization of this variable in block 101 or 143. Other embodiments may define the minimum thermal SEV and the maximum thermal SEV variables differently.

To establish the foregoing variables, the anomaly detection logic 70 determines the current signal-to-noise ratio of the line 25 in block 107. This signal-to-noise ratio may be calculated at the transceiver 23 via known techniques and provided to the logic 70. If the current signal-to-noise ratio is less than the value of the detection SEV, then the anomaly detection logic 70 sets the detection SEV equal to the current signal-to-noise ratio, as shown by blocks 108 and 109. If the current signal-to-noise ratio is equal to or greater than the value of the detection SEV, then the anomaly detection logic 70 does not change the value of the detection SEV. Thus, the detection SEV is equal to the minimum signal-to-noise ratio detected since the last initialization of the detection SEV in block 101 or 117.

In block 110, the anomaly detection logic 70 compares the current signal-to-noise ratio to the minimum thermal SEV. If the current signal-to-noise ratio is less than the value of the minimum thermal SEV, the anomaly detection logic 70 sets the minimum thermal SEV equal to the current signal-to-noise ratio, as shown by block 111. If the current signal-to-noise ratio is equal to or greater than the value of the minimum thermal SEV, then the anomaly detection logic 70 does not change the value of the minimum thermal SEV. Thus, the minimum thermal SEV is equal to the minimum signal-to-noise ratio detected since the last initialization of the minimum thermal SEV in block 101 or 143.

In block 112, the anomaly detection logic 70 compares the current signal-to-noise ratio to the maximum thermal SEV. If the current signal-to-noise ratio is greater than the value of the maximum thermal SEV, the anomaly detection logic 70 sets the maximum thermal SEV equal to the current signal-to-noise ratio, as shown by block 113. If the current signal-tonoise ratio is equal to or less than the value of the maximum thermal SEV, then the anomaly detection logic 70 does not change the value of the maximum thermal SEV. Thus, the maximum thermal SEV is equal to the maximum signal-to-noise ratio detected since the last initialization of the maximum thermal SEV in block 101 or 143.

Once the timer 81 expires, the anomaly detection logic 70, in block 114, compares the detection SEV to a value, referred to hereafter as the "signal error threshold" or "SET." The signal error threshold compared in block 114 is preferably set to a value such that the detection SEV is greater than this threshold when reliable communication has continuously occurred since the last initialization of the detection SEV in blocks 101, 117, or 143. In this regard, if the data communication occurring over line 25 has too many errors due to severe line anomalies or other types of communication problems, then the anomaly test results during such times of significant communication errors may be unreliable. In this regard, during periods of significant communication error across line 25, it is unlikely that the tap coefficients 66 of the echo canceler are sufficient for properly cancelling the echo of the transmitted signal, and anomaly tests based on the tap coefficients 66 may not be reliable. Moreover, the general purpose of the comparison performed in block 114 is to ensure that an unreasonable amount of error is not present on the line 25 before testing the line 25 for anomalies. Although other values may be used, the signal error threshold in one exemplary embodiment is equal to 3 decibels (dB).

If the detection SEV is not greater than the signal error threshold, then a "no" determination is made in block 114. In such a scenario, the anomaly detection logic 70, in block 117, initializes the detection SEV to its maximum possible value, as described above with reference to block 101, and the anomaly detection logic 70 then repeats blocks 105-113 until the next expiration of timer 81.

When a "yes" determination is made in block 114, a relatively low number of errors occurred during the last cycle of the timer 81. Thus, it is likely that the current tap coefficients 66 of the echo canceler 63 are sufficient to cancel the echo of the transmitted signal. These current tap coefficients 66 are, therefore, valid for use in anomaly detection. Since a valid set of tap coefficients 66 now exists, the anomaly detection logic 70 decrements the thermal tracking count in block 115, and the echo canceler tap coefficients 66 are read and stored in block 116. As will be described in more detail hereafter, the thermal tracking count is used to ensure that periodic updates of the baseline tap coefficients 88 occur, thereby accounting for gradual changes to the tap coefficients 66 due to temperature fluctuations.

In block 118, the anomaly detection logic 70 determines whether a baseline set of echo tap coefficients 88 already exists. If a "no" determination is made, then the current echo tap coefficients 66 are stored as the baseline set of tap coefficients 88 in block 139, and the thermal tracking count is then reset or re-initialized to its starting value (e.g., four in the instant embodiment) in block 143. The maximum thermal SEV and minimum thermal SEV are also reset or re-initialized in block 143. For illustrative purposes, assume that the tap coefficient of tap a has a value of one-thousand (1000) upon a "no" determination in block 118. In such an example, the anomaly detection logic 70, in block 139, stores a value of one-thousand (1000) in memory 75 as the baseline tap coefficient for tap a. Likewise the other tap coefficients 66 of the other taps 64 in existence may be used to establish the other baseline tap coefficients 88.

If a "yes" determination is made in block 118, then a set of baseline tap coefficients 88 already exists. In block 120 of FIG. 7, the anomaly detection logic 70 takes the current tap coefficients 66 that were read and stored in block 116 and compares these coefficients to the baseline tap coefficients 88 in an effort to detect line anomalies. In particular, for each tap 64, the logic 70 subtracts the tap's current coefficient from its corresponding baseline tap coefficient to compute a difference that indicates how much the tap's coefficient has changed since the last occurrence of block 139.

In blocks 123 and 131, the anomaly detection logic 70 detects possible line anomalies. In block 123, the anomaly detection logic 70 compares each tap difference computed in block 120 to the corresponding tap threshold stored in memory 75 (FIG. 5). If none of the tap differences from block 120 respectively exceed the corresponding tap thresholds 85, then the coefficients of the taps 64 have not changed by an amount large enough to indicate that a line anomaly may exist. If such a "no" determination is made in block 123, then the anomaly detection logic 70 checks the thermal tracking count in block 127 to determine whether to update the baseline tap coefficients 88. If the thermal count equals zero, then the baseline tap coefficients 88 are updated in block 139 as described above. The thermal tracking count, along with the maximum thermal SEV and minimum thermal SEV, are then reset or re-initialized in block 143.

Note that utilization of the thermal tracking count, as described above, ensures that the baseline tap coefficients 88 are periodically updated, via block 139, thereby ensuring that gradual fluctuations in the tap coefficients 66 due to temperature changes are accommodated. By initializing the thermal tracking count to a value of four in the instant example, it can be ensured that the baseline tap coefficients 88 are updated at least every four cycles of the timer 81 in which an acceptable error rate is present. Thus, in the instant embodiment where each cycle of timer 81 is thirty seconds, the thermal tracking count is used to ensure that the baseline tap coefficients 88 are updated at least once every two minutes of substantially error free data transmission.

If a "yes" determination is made in block 123, then at least one of the tap differences calculated in block 120 exceeds the corresponding tap threshold 85 (i.e., the tap threshold 85 associated with the same tap 64). This means that one or more of the tap coefficients 66 has changed by a significantly large amount indicating that a line anomaly may exist.

Block 131 helps to reduce false detections of anomalies. To accurately detect degraded splices that can cause reduced transceiver performance, it is desirable for the thresholds 85 compared in block 123 to be relatively sensitive. Therefore, thermal changes and noise could cause a false anomaly detection in block 123 when, in fact, no anomaly exists. However, a degraded splice exhibiting impedance changes of severity to cause performance problems will also cause degraded and fluctuating signal error values.

In block 131, the anomaly detection logic 70 compares the maximum thermal SEV and the minimum thermal SEV that have occurred since the last occurrence of block 101 or 143. In particular, the difference of these two variables is calculated and compared to a SEV delta threshold (e.g., 5 dB). If the difference between the maximum thermal SEV and minimum thermal SEV does not exceed the SEV delta threshold, then it is likely that the change in tap coefficients detected in block 123 is due to a problem other than a line anomaly, or it is likely that the transceiver's data pump adequately responded to the problem. Thus, in such an scenario, an anomaly indication is not provided (i.e., block 135 is skipped), and the anomaly detection logic 70 checks the thermal tracking count 127 to see if it is time to update the baseline tap coefficients 88 as previously described above.

If in block 131, the difference between the maximum thermal SEV and minimum thermal SEV does exceed the SEV delta threshold, then the anomaly detection is considered valid. The anomaly detection logic 70 then stores an anomaly indication for the tap 64 whose threshold was exceeded by the largest amount in block 123. In other embodiments, all taps 64 whose thresholds were exceeded could be indicated.

As described above, the anomaly detection logic 70 may maintain a histogram having a different running sum associated with each tap 64. If a tap 64 has the largest difference between its current coefficient and its baseline coefficient than the other taps 64 and if that difference exceeds the corresponding tap threshold 85 in block 123, the anomaly detection logic 70, in block 135, may increment the tap's running sum. Thus, the running sum for a particular tap 64 indicates the total number of times that the anomaly detection logic 70 detected a possible line anomaly based on a comparison of the tap's coefficient in the echo canceler 63 with the tap's baseline coefficient stored in memory 75. In general, the higher the value of the tap's running sum, the more likely it is that a line anomaly, such as a degraded splice, exists at the location of the line 25 corresponding to the tap 64.

To better illustrate the implementation of blocks 120, 123, 131, and 135, assume that the line detection logic 70 reads a value of one-thousand-seven-hundred (1700) for tap a in block 120. Also assume the baseline tap coefficient of tap a is one-thousand (1000) and the corresponding tap threshold for tap a is five-hundred (500). In such an example, the absolute value of the difference between the tap's current and baseline tap coefficients is seven-hundred (700), which exceeds the tap threshold of tap a. Therefore, block 123 would result in a "yes" decision. Assume all other taps are evaluated similarly and their differences minus their thresholds are less than that of tap a. Also assume the maximum SEV was 17 dB and the minimum SEV was 6 dB. Then the difference between these two is 11 dB, which is greater than the SEV delta threshold of 5 dB. Therefore, block 131 would yield a "yes" decision. Thus, in block 135, the line detection logic 70 increments the running sum in the histogram for tap a.

However, now assume that the line detection logic 70 reads a value of one-thousand-three-hundred (1300) instead of one-thousand-seven-hundred (1700) for tap a in block 131. In such an example, the absolute value of the difference between the tap's current and baseline tap coefficients is three-hundred (300), which does not exceed the tap threshold of tap a. Thus, in block 123, the line detection logic 70 does not increment the running sum in the histogram for tap a.

As shown by the flowchart of FIGS. 6 and 7, the aforedescribed process may be repeated over time. Note that the anomaly detection logic 70 may be configured to take a sample periodically (e.g., every 30 seconds). By repeating the process of FIGS. 6 and 7 over time, the accuracy of the histogram for estimating the location or locations of one or more line anomalies increases. In this regard, anomaly indications are more likely to occur for the taps 64 corresponding with anomaly locations. Indeed, in the present example, only one anomaly exists on line 25, and the location of this anomaly corresponds with tap a. Thus, by repeating the process of FIGS. 6 and 7, it is likely that the running sum for tap a will have the highest value in the histogram. Accordingly, by analyzing the histogram, it is possible to predict the location of the anomaly.

Indeed, it is possible to establish a running sum threshold such that any running sum of the histogram that exceeds the threshold indicates an existence of a line anomaly at a line location corresponding to the tap 64 associated with the running sum. The anomaly detection logic 70 may be configured to analyze the histogram and to detect an anomaly for each running sum that exceeds the running sum threshold. In the instant example where there is only one anomaly, which is located at a location corresponding with tap a, the threshold is preferably set to a value that is below the running sum associated with tap a but is above each of the running sums of taps 64 corresponding to locations that are not close to the anomaly location. Such a threshold may depend on a ratio of the histogram counts for each specific tap versus the total histogram counts. In other embodiments, other methodologies for determining the running sum threshold may be employed.

Figure 8:
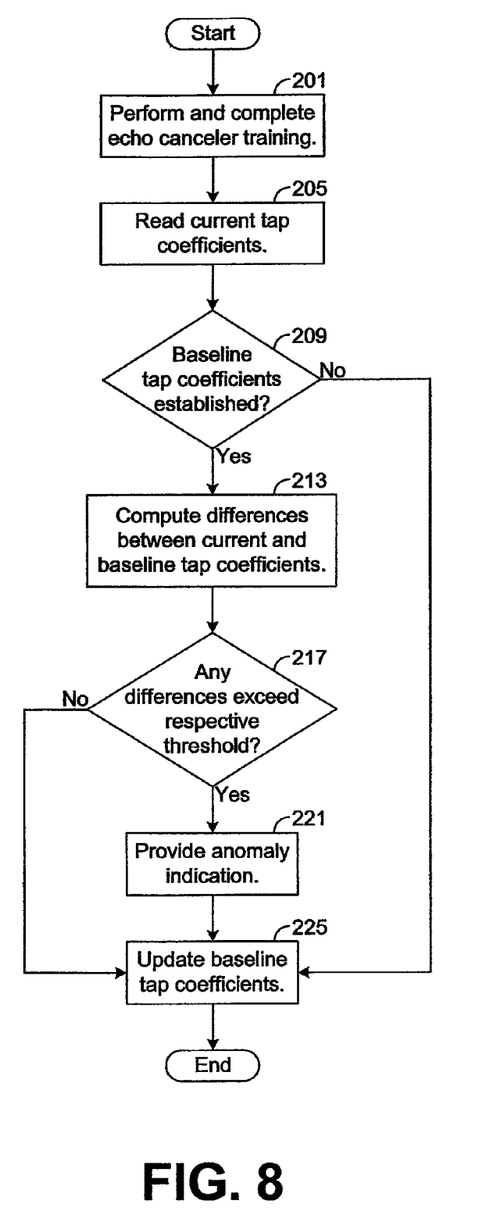
FIG. 8 is a flow chart illustrating another exemplary methodology that may be used by the anomaly detection system of FIG. 1.

The second case of the telecommunication line anomaly detection, referred to herein as case two, is when the severity of the anomaly prevents the transceiver 23 from reaching synchronization altogether. FIG. 8 depicts an exemplary methodology that may be employed by the anomaly detection logic 70 in order to detect such an anomaly.

For the purposes of illustration, assume that the anomaly detection logic 70 is configured to track the coefficients of n number taps of the echo canceler 63, where n is any positive integer. Further assume that a particular one of the taps 64, referred to hereafter as "tap a," corresponds to a location on the telecommunication line 25 that is a distance "d"(FIG. 2) from the transceiver 23. In this regard, a change in the contact resistance of the telecommunication line 25 at a distance d from the transceiver 23 causes the tap coefficient of tap a to change. For the purposes of illustration, assume that a significantly degraded splice is located at distance d from the transceiver 23, thereby causing the resistivity of the line 25 at distance d from the transceiver 23 to significantly fluctuate over time resulting in an inability to reliably train and maintain a stable data mode signal. Also assume that there are no other degraded splices or other types of line anomalies on the telecommunication line 25.

Similar to conventional transceivers, the transceiver 23 may try to establish communication settings, such as an initial set of tap coefficients 66, for example, in a training mode and then communicate data in a data mode that follows the training mode. If an anomaly on the telecommunication line 25 is severe enough, the transceiver 23 may continuously try to train without ever attaining data mode, or it may alternate between an unreliable data mode and training. In the embodiment, depicted by FIG. 8, steps are taken to detect line anomalies during training when the severity of the anomalies is such that reliable data mode communication over the telecommunication line 25 is prevented.

During the training mode of the transceiver 23, there is a segment of the train used for the purpose of training the echo canceler 63. This segment of the train does not need as high a quality telecommunication line to successfully train the echo canceler as is needed to maintain a reliable data mode. In the case of the severe splice or line anomaly, the anomaly detection logic 70 may utilize the echo canceler tap coefficients 66 after the echo canceler training segment of the transceiver training sequence to detect the anomaly.

In block 201, the echo canceler 63 in the transceiver 23 trains until it properly converges on a solution. In other methodologies, a signal error value or other diagnostic may be evaluated to determine the level of convergence of the echo tap coefficients 66 for anomaly detection. Since a valid set of tap coefficients 66 exists upon completion of block 201, the echo tap coefficients 66 are read and stored in block 205. In block 209, the anomaly detection logic 70 determines whether a baseline set of echo tap coefficients 88 already exists. If a "no" determination is made, then the current echo canceler tap coefficients 66 are stored as the baseline set of tap coefficients 88 in block 225, and the anomaly detection logic 70 exits the process depicted by FIG. 8. The transceiver 23 will continue training and may either enter data mode or fail to attain data mode and retrain. For illustrative purposes, assume that the tap coefficient of tap a has a value of one-thousand (1000) upon a "no" determination in block 209. In such an example, the anomaly detection logic 70, in block 225, stores a value of one-thousand (1000) in memory 75 as the baseline tap coefficient for tap a. Likewise, the other tap coefficients 66 of the other taps 64 in existence may be used to establish the other baseline tap coefficients 88.

If a "yes" determination is made in block 209, then a baseline set of echo tap coefficients 88 already exists. In block 213 of FIG. 8, the anomaly detection logic 70 takes the current tap coefficients 66 that were read and stored in block 205 and compares these coefficients to the baseline tap coefficients 88 in an effort to detect line anomalies. In particular, for each tap 64, the anomaly detection logic 70, in block 213, subtracts the tap's current coefficient from its corresponding baseline tap coefficient to compute a difference that indicates how much the coefficients of the tap 64 has changed since the last occurrence of block 225.

In block 217, the anomaly detection logic 70 detects possible line anomalies. In particular, if none of the tap differences computed in block 213 exceed the corresponding tap thresholds 85, then the coefficients of the taps 64 have not changed by an amount large enough to indicate a line anomaly may exist. If such a "no" determination is made in block 217, then the anomaly detection logic 70 uses the coefficients read in block 205 to update the baseline tap coefficients 88, as described earlier, and the anomaly detection logic 70 exits the process depicted by FIG. 8. If a "yes" determination is made in block 217, then at least one of the tap differences calculated in block 213 exceeds the corresponding tap threshold 85 (i.e., the tap threshold 85 associated with the same tap 64). This means that one or more of the tap coefficients 66 has changed by a significantly large amount indicating that a line anomaly may exist.

If a "yes" determination is made in block 217, then the anomaly detection logic 70 proceeds to block 221. The anomaly detection logic 70 may maintain a histogram having a different running sum associated with each tap 64. If a tap 64 has the largest difference between its current coefficient and its baseline coefficient than the other taps 64 and if that difference exceeds the corresponding tap threshold 85 in block 217, then the anomaly detection logic 70, in block 221, increments the tap's running sum. Thus, the running sum for a particular tap 64 indicates the total number of times that the anomaly detection logic 70 detected a possible line anomaly based on a comparison of the tap's coefficient in the echo canceler 63 with the tap's baseline coefficient stored in memory 75. In general, the higher the value of the tap's running sum, the more likely it is that a line anomaly, such as a degraded splice, exists at the location of the line 25 corresponding to the tap 64. After updating the histogram in block 221, the anomaly detection logic 70 uses the coefficients read in block 205 to update the baseline tap coefficients 88 as described earlier, and the anomaly detection logic 70 exits the process depicted by FIG. 8.

The process defined by the flowchart of FIG. 8 may be repeated each time the transceiver trains or retrains. By repeating this process over time, the accuracy of the histogram for estimating the location or locations of one or more line anomalies increases. In this regard, anomaly indications are more likely to occur for the taps 64 corresponding with anomaly locations. Indeed, in the present example, only one anomaly exists on line 25, and the location of this anomaly corresponds with tap a. Thus, by repeating the process of FIG. 8, it is likely that the running sum for tap a will have the highest value in the histogram. Accordingly, by analyzing the histogram, it is possible to predict the location of the anomaly.

The invention claimed is:

1. An anomaly detection system, comprising:
a telecommunication line having a plurality of wires including at least a first wire joined to a second wire, the telecommunication line having a time varying anomaly at a junction of the first wire and the second wire, the time varying anomaly causing a transmission characteristic of the telecommunication line to fluctuate at the junction;
a transmitter coupled to the telecommunication line; and
anomaly detection logic configured to detect the anomaly based on signals communicated across the telecommunication line, the anomaly detection logic further configured to indicate a location of the detected anomaly along the telecommunication line.

2. The system of claim 1, wherein the transmitter is configured to transmit signals across the telecommunication line, and wherein the anomaly detection logic is configured to detect the anomaly based on echoes of the signals.

3. The system of claim 1, further comprising logic configured to maintain tap coefficients based on the signals, wherein the anomaly detection logic is configured to detect the anomaly based on the tap coefficients.

4. The system of claim 3, wherein each of the tap coefficients is indicative of an impedance of the junction at a different moment in time, wherein the anomaly detection logic is configured to compare each of the tap coefficients to at least one baseline coefficient, and wherein the anomaly detection logic is configured to determine a value based on each comparison and to detect the anomaly based on the value.

5. The system of claim 4, wherein the anomaly detection logic is configured to determine the tap coefficients during data communication between the transmitter and a remote receiver coupled to the transmitter via the telecommunication line.

6. The system of claim 3, wherein the anomaly detection logic is configured to determine the tap coefficients during data communication between the transmitter and a remote receiver coupled to the transmitter via the telecommunication line.

7. The system of claim 1, wherein the signals are communicated across the telecommunication line during data communication between the transmitter and a remote receiver coupled to the transmitter via the telecommunication line.

8. The system of claim 1, further comprising an echo canceler configured to cancel, based on a plurality of tap coefficients, echoes of signals transmitted by the transmitter across the telecommunication line, the echo canceler configured to adjust the tap coefficients based on the echoes, wherein the anomaly detection logic is configured to detect the anomaly based on the tap coefficients.

9. The system of claim 1, wherein the signals are transmitted by the transmitter across the telecommunication line and are received by a remote receiver from the telecommunication line.

10. The system of claim 1, further comprising logic configured to store tap coefficients and to adjust the tap coefficients based on signals communicated across the telecommunication line, wherein the anomaly detection logic is configured to detect the anomaly based on the tap coefficients.

11. An anomaly detection system, comprising:
  a telecommunication line having a plurality of wires including at least a first wire joined to a second wire, the telecommunication line having a time varying anomaly at a junction of the first wire and the second wire, the time varying anomaly causing a resistance of the telecommunication line at the junction to fluctuate;
  a first transceiver coupled to the telecommunication line and configured to communicate with a second transceiver via the telecommunication line; and
  anomaly detection logic configured to detect the anomaly based on signals communicated from the first transceiver to the second transceiver.

12. The system of claim 11, further comprising logic configured to maintain tap coefficients based on the signals, wherein the anomaly detection logic is configured to detect the anomaly based on the tap coefficients.

13. The system of claim 12, wherein each of the tap coefficients is indicative of the resistance at the junction at a different moment in time, wherein the anomaly detection logic is configured to compare each of the tap coefficients to at least one baseline coefficient, and wherein the anomaly detection logic is configured to determine a value based on each comparison and to detect the anomaly based on the value.

14. The system of claim 11, further comprising an echo canceler configured to cancel echoes of the signals based on a plurality of tap coefficients, the echo canceler configured to adjust the tap coefficients based on the echoes, wherein the anomaly detection logic is configured to detect the anomaly based on the tap coefficients.

15. The system of claim 11, further comprising logic configured to store tap coefficients based on the signals and to adjust the tap coefficients based on the signals, wherein the anomaly detection logic is configured to detect the anomaly based on the tap coefficients.

16. An anomaly detection method, comprising the steps of:
  communicating signals across a telecommunication line, the telecommunication line having a plurality of wires including at least a first wire joined to a second wire, the telecommunication line further having a time varying anomaly at a junction of the first wire and the second wire, the time varying anomaly causing a resistance of the telecommunication line at the junction to fluctuate;
  automatically detecting the anomaly based on the signals; and
  indicating a location of the detected anomaly.

17. The method of claim 16, wherein the detecting step is based on echoes of the signals.

18. The method of claim 16, further comprising the step of maintaining tap coefficients based on the signals, wherein the detecting step is based on the tap coefficients.

19. The method of claim 16, further comprising the steps of:
  canceling echoes of the signals based on a plurality of tap coefficients; and
  adjusting the tap coefficients based on the echoes, wherein the detecting step is based on the tap coefficients.

20. The method of claim 16, further comprising the steps of:
  storing tap coefficients; and
  updating the tap coefficients based on the signals, wherein the detecting step is based on the tap coefficients.

21. The method of claim 16, further comprising the steps of:
  comparing a first tap coefficient to at least one baseline coefficient, the first tap coefficient indicative of an impedance at the junction during a first time period;
  updating the first tap coefficient thereby forming an updated tap coefficient indicative of an impedance at the junction during a second time period;
  comparing the updated tap coefficient to the at least one baseline coefficient; and
  determining a value based on each of the comparing steps, wherein the detecting step is based on the value.

22. The method of claim 21, wherein the at least one baseline coefficient includes a first baseline coefficient and a second baseline coefficient, wherein the comparing the first tap coefficient to the at least one baseline coefficient step comprises the step of comparing the first tap coefficient to the first baseline coefficient, wherein the method further comprises the step of updating the first baseline coefficient thereby forming the second baseline coefficient, and wherein the comparing the updated tap coefficient step comprises the step of comparing the updated tap coefficient to the second baseline coefficient.

23. The method of claim 18, wherein each of the tap coefficients corresponds to a respective point along the telecommunication line, and wherein the method further comprises the step of comparing changes in one of the tap coefficients to changes in other tap coefficients, wherein the detecting step is based on the comparing step.

24. The system of claim 3, wherein each of the tap coefficients corresponds to a respective point along the telecommunication line, wherein the anomaly detection logic is configured to compare changes in one of the tap coefficients to changes in other tap coefficients for determining whether an anomaly exists at the point along the telecommunication line corresponding to the one tap coefficient.

25. The system of claim 12, wherein each of the tap coefficients corresponds to a respective point along the telecommunication line, wherein the anomaly detection logic is configured to determine a value indicative of an amount that the one tap coefficient changes over time relative to changes in other tap coefficients, and wherein the anomaly detection logic is configured to detect the anomaly based on the value.

* * * * *